(12) United States Patent
Soler et al.

(10) Patent No.: US 11,551,362 B2
(45) Date of Patent: Jan. 10, 2023

(54) AUTOMATIC SEGMENTATION PROCESS OF A 3D MEDICAL IMAGE BY SEVERAL NEURAL NETWORKS THROUGH STRUCTURED CONVOLUTION ACCORDING TO THE GEOMETRY OF THE 3D MEDICAL IMAGE

(71) Applicants: INSTITUT DE RECHERCHE SUR LES CANCERS DE L'APPAREIL DIGESTIF—IRCAD, Strasbourg (FR); VISIBLE PATIENT, Strasbourg (FR); CONSERVATOIRE NATIONAL DES ARTS ET METIERS (C.N.A.M.), Paris (FR)

(72) Inventors: Luc Soler, Strasbourg (FR); Nicolas Thome, Champigny sur Marne (FR); Alexandre Hostettler, Strasbourg (FR); Jacques Marescaux, Scharrachbergheim (FR)

(73) Assignees: INSTITUT DE RECHERCHE SUR LES CANCERS DE I, Strasbourg (FR); VISIBLE PATIENT, Strasbourg (FR)

( * ) Notice: Subject to any disclaimer, the term of this patent is extended or adjusted under 35 U.S.C. 154(b) by 0 days.

(21) Appl. No.: 16/960,709

(22) PCT Filed: Jan. 10, 2019

(86) PCT No.: PCT/EP2019/050542
§ 371 (c)(1),
(2) Date: Jul. 8, 2020

(87) PCT Pub. No.: WO2019/137997
PCT Pub. Date: Jul. 18, 2019

(65) Prior Publication Data
US 2020/0334826 A1    Oct. 22, 2020

(51) Int. Cl.
*G06K 9/00* (2022.01)
*G06T 7/174* (2017.01)
*G06T 7/11* (2017.01)

(52) U.S. Cl.
CPC ............... *G06T 7/174* (2017.01); *G06T 7/11* (2017.01); *G06T 2207/10072* (2013.01); *G06T 2207/10132* (2013.01); *G06T 2207/20084* (2013.01)

(58) Field of Classification Search
CPC ........................................... G06T 2207/10081
See application file for complete search history.

(56) References Cited

U.S. PATENT DOCUMENTS 9,947,102 B2    4/2018  Xu et al.
9,965,863 B2    5/2018  Xu et al.
(Continued)

OTHER PUBLICATIONS

Adhish Prasoon et al: "Deep Feature Learning for Knee Cartilage Segmentation Using a Tri planar Convolutional Neural Network" Jan. 1, 2013. Abstract Section Tri planar Convolutional Neural p. 249-p. 250.

(Continued)

*Primary Examiner* — Hadi Akhavannik
(74) *Attorney, Agent, or Firm* — Ipsilion USA, LLP

(57) ABSTRACT

This invention concerns an automatic segmentation method of features, such as anatomical and pathological structures or instruments, which are visible in a 3D medical image of a subject, composed of voxels.
  Said method being characterised in that it consists
  in providing a global software means or arrangement combining N different convolutional neural networks or CNNs, with N≥2, and having a structured geometry or architecture adapted and comparable to that of the image volume, (Continued)

and in analysing voxels forming said volume of the 3D image according to N different reconstruction axes or planes, each CNN being allocated to the analysis of the voxels belonging to one axis or plane.

14 Claims, 7 Drawing Sheets

(56) References Cited

U.S. PATENT DOCUMENTS

| | | | |
|---|---|---|---|
| 9,968,257 B1* | 5/2018 | Burt | A61B 5/0035 |
| 10,134,141 B2 | 11/2018 | Xu et al. | |
| 10,346,986 B2 | 7/2019 | Xu et al. | |
| 10,387,740 B2 | 8/2019 | Yang et al. | |
| 10,430,949 B1 | 10/2019 | Wang et al. | |
| 10,546,389 B2 | 1/2020 | Hillborg | |
| 10,580,131 B2 | 3/2020 | Mazo | |
| 2018/0150740 A1* | 5/2018 | Wang | G06T 7/248 |
| 2019/0080453 A1 | 3/2019 | Song et al. | |
| 2019/0347792 A1 | 11/2019 | Pauly et al. | |
| 2020/0037962 A1 | 2/2020 | Shanbhag et al. | |

OTHER PUBLICATIONS

Kisuk Lee et al: "Recursive Training of 2D-3D Convolutional Networks for Neuronal Boundary Detection" Aug. 19, 2015.
Jianxu Chen et al: "Combining Fully Convolutional and Recurrent Neural Networks for 3D Biomedical Image Segmentation" Sep. 4, 2016.
Marijn F Stol Ienga et al: "Parallel Multi-Dimensional LSTM, With Application to Fast Biomedical Volumetric Image Segmentation" Jun. 24, 2015.
Aliasghar Mortazi et al: "Multi-Planar Deep Segmentation Networks for Cardiac Substructures from MRI and CT", Aug. 2, 2017.
Preliminary Search Report dated Apr. 30, 2020.
International Search Report dated Feb. 28, 2019.
Arnaud Arindra Adiyoso Setio et al. "Pulmonary Nodule Detection in CT Images: False Positive Reduction Using Multi-View Convolutional Networks" vol. 35, No. 5, May 2016.

\* cited by examiner

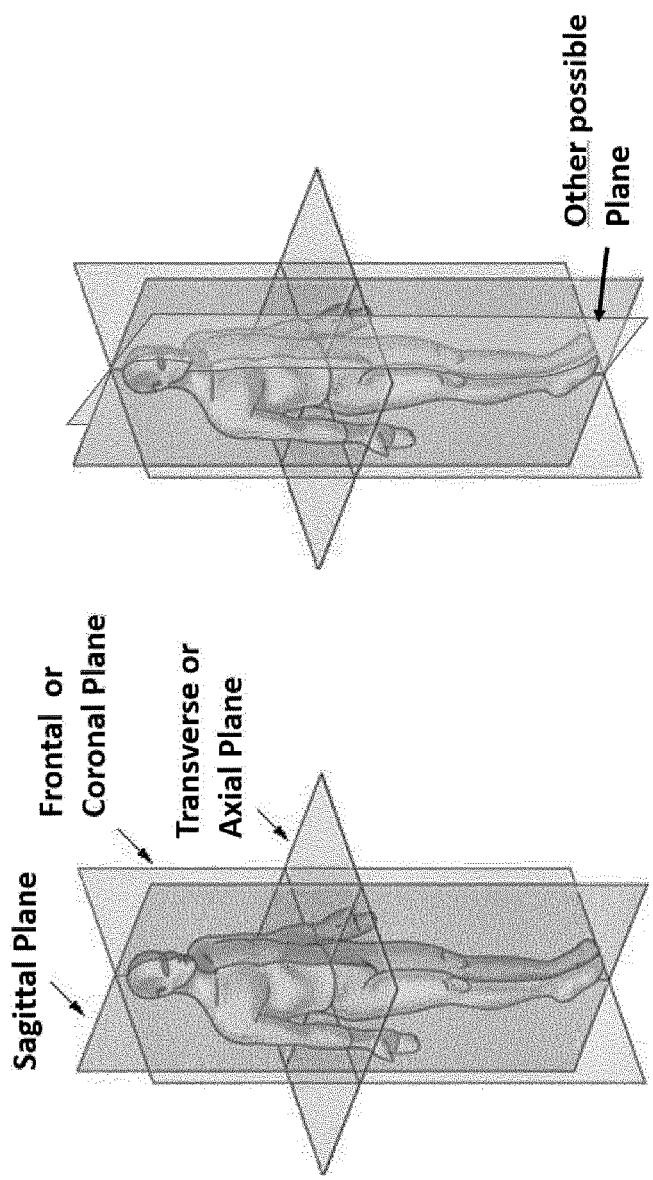
Fig. 2
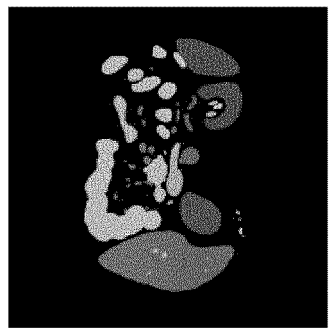
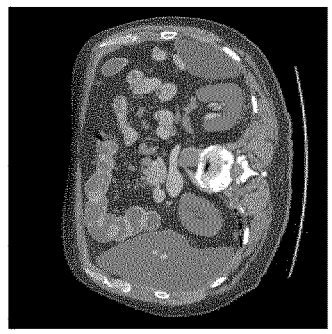
Fig. 3

US 11,551,362 B2

AUTOMATIC SEGMENTATION PROCESS OF A 3D MEDICAL IMAGE BY SEVERAL NEURAL NETWORKS THROUGH STRUCTURED CONVOLUTION ACCORDING TO THE GEOMETRY OF THE 3D MEDICAL IMAGE

RELATED APPLICATION

This application is a National Phase of PCT/EP2019/050542 filed on Jan. 10, 2019 which claims the benefit of priority from U.S. Provisional Patent Application No. 62/615,529, filed on Jan. 10, 2018, the entirety of which are incorporated by reference.

BACKGROUND

Field of the Invention

The present invention is related to the field of data processing, more specifically to the treatment and analysis of images, in particular the segmentation of medical images, and concerns an automatic segmentation process of a 3D medical image by one or several neural networks through structured convolution according to the geometry or structuration of the 3D medical image.

Description of the Related Art

A three-dimensional image made from a medical imaging device such as a scanner, MRI, ultrasound, CT or SPEC type image is composed of a set of voxels, which are the basic units of a 3D image. The voxel is the 3D extension of the pixel, which is the basic unit of a 2D image. Each voxel is associated with a grey level or density, which can be considered to be the result of a 2D function $F(x, y)$ or a 3D function $F(x, y, z)$, where x, y and z denote spatial coordinates (see FIG. 1).

In 3D images, voxels can be seen in 2D according to various axes or planes. The three main axes or planes in medical images are the axial, sagittal and frontal ones (FIG. 2). A limitless number of axes or planes can however be created with a different angulation.

Typically, a 2D or 3D medical image contains a set of anatomical and pathological structures (organs, bones, tissues, . . . ) or artificial elements (stents, implants, instruments, . . . ) that clinicians have to delineate in order to evaluate the situation and to define and plan their therapeutic strategy. In this respect, organs and pathologies have to be identified in the image, which means labelling (for example coloring) each pixel of a 2D image or each voxel of a 3D image. This process is called segmentation.

FIG. 3 shows, by way of example, the stages of a 3D medical image segmentation as per a transverse view.

There are many known methods to perform a segmentation, in particular automatic methods making use of algorithms, especially AI algorithms.

In this context, numerous variations of neural networks have been used in the state of the art, all based on standard non-specific architectures, resulting globally in a waste of inappropriate resources and a lack of efficiency and accuracy.

Objects and Summary

The main aim of the present invention is to propose a new method and a new system intended for overcoming the aforementioned limitations.

Therefore the present invention relates to an automatic segmentation method of features, such as anatomical and pathological structures or instruments, which are visible in a 3D medical image of a subject, composed of voxels, said method being characterised in that it consists in providing a global software means or arrangement combining N different convolutional neural networks or CNNs, with N≥2, and having a structured geometry or architecture adapted and comparable to that of the image volume, and in analysing voxels forming said volume of the 3D image according to N different reconstruction axes or planes, each CNN being allocated to the analysis of the voxels belonging to one axis or plane.

BRIEF DESCRIPTION OF THE DRAWINGS

The invention will be better understood using the description below, which relates to several preferred embodiments, given by way of non-limiting examples and explained with reference to the accompanying drawings, wherein.

DETAILED DESCRIPTION

Shown on FIGS. 4 to 8 of the attached drawings, is an automatic segmentation method of features, such as anatomical and pathological structures or instruments, which are visible in a 3D medical image of a subject, composed of voxels.

According to the invention, said method consists in providing a global software means or arrangement combining N different convolutional neural networks or CNNs, with N≥2, and having a structured geometry or architecture adapted and comparable to that of the image volume, and in analysing voxels forming said volume of the 3D image according to N different reconstruction axes or planes, each CNN being allocated to the analysis of the voxels belonging to one axis or plane.

Thus, the invention provides for a structured organization and a coordinated working together of multiple CNNs taking into account the very geometry, structuration and content of a medical image.

This specific composite computing system (possibly grouped in a single framework) which combines N different CNNs (with N≥2, preferably N≥3) according to N different reconstruction axes or planes of the 3D image volume allows to extend the use of known CNN for analising and segmenting 2D images, to 3D images.

Typically, a known CNN algorithm which may be used within the method and the system of the present invention is "U-Net" (see for example: "U-Net: Convolutional Networks for Biomedical Image Segmentation"; O. Ronneberger et al.; MICCAI 2015, Part III, LNCS 3951, pp 234"241, Springer IPS).

"U-Net" may be implemented in connection with other known architectures such as "ResNet" or "DenseNet".

Advantageously, the inventive method may consist, as also shown on FIGS. 4 to 8, for each of the N reconstruction planes of the 3D image, in analysing and segmenting the 2D image formed by the voxels of a given plane by means of a dedicated $CNN_i$ among N provided CNNs, said CNNs being structured similarly to the 3D image volume, and in combining the intermediary or end results of said N analyses performed by said different CNNs.

By segmenting the 3D image volume for analysing purposes and by merging (combining) the results of these partial analyses into a single 3D image segmentation, the invention allows to realise complex segmentation procedures with limited resources and to deliver quickly accurate and somehow cross-checked results.

Figure 1:
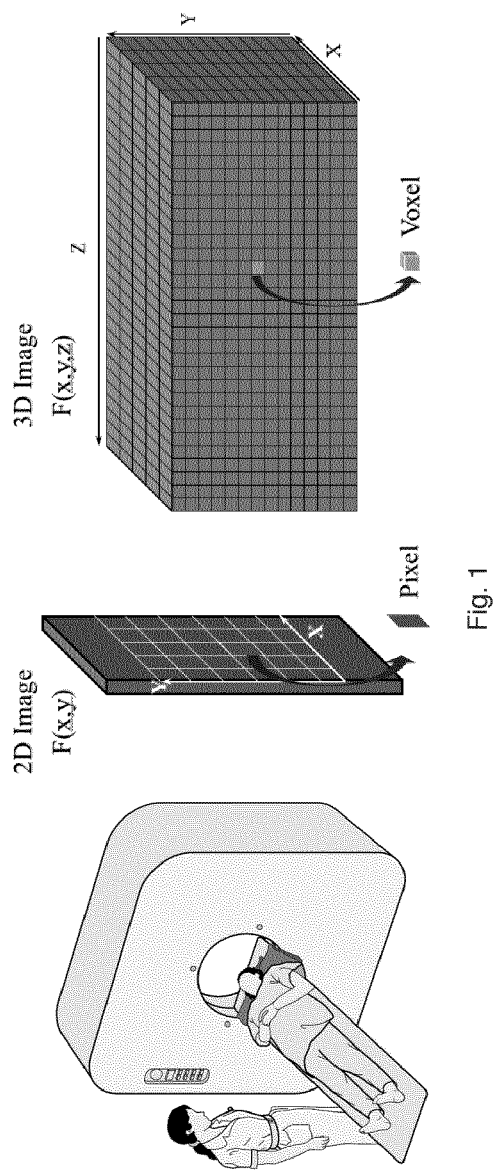
Figure 4:
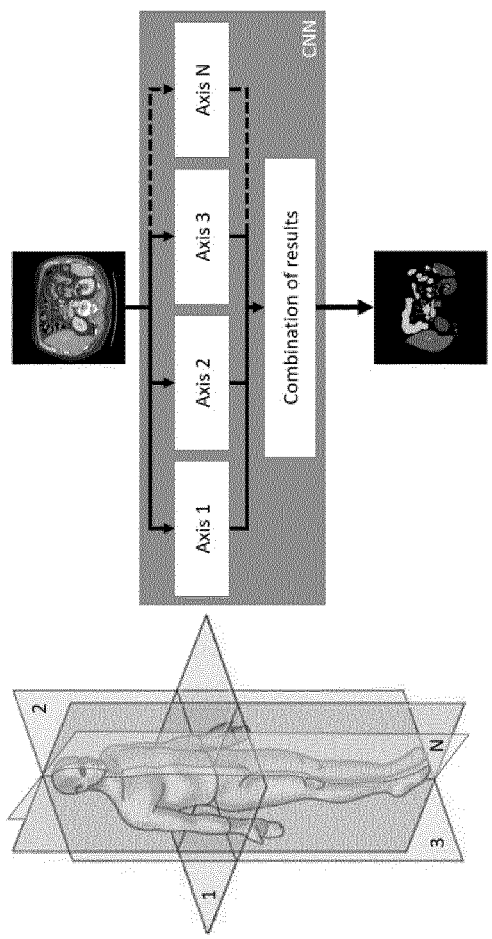
FIG. 4 is a schematic and symbolic representation of a unique global CNN algorithm integrating different analyses axes or planes of the 3D image, according to a first embodiment of the invention, a specific CNN being allocated to each axis or plane.

The combination or merging of the results of the N analyses and segmentations may be performed:
- by combining for each voxel the intermediate activations of the N networks (see FIG. 4—so-called "feature combination"). The resulting merged information are then received as entry data by a global CNN which provides the final segmentation of the image;
- by combining the exit information of the N different CNNs (see FIGS. 7 and 8—late fusion or merging), for example by (weighted) summing of the classifiers, multiplication or an other adapted prediction ensembling operation known by the man skilled in the art.

According to a first embodiment of the invention shown on FIG. 4, the method can consist in providing a single neural network integrating in its structure N different CNNs, advantageously working in parallel, which automatically segment anatomical and pathological structures or instruments that can be seen in the 3D medical image, in that each CNN analyses all the voxels forming the volume of said 3D image according to a different reconstruction plane or axis and in that the results of the different 2D analyses and segmentations are combined through convolution in the last structures of said neural network with structured geometry.

In this case, the very internal structure of the so formed single meta-CNN integrates the 3D axes image analysis, as well as the combination of the information resulting from the different 2D analyses and segmentations.

Figure 6:
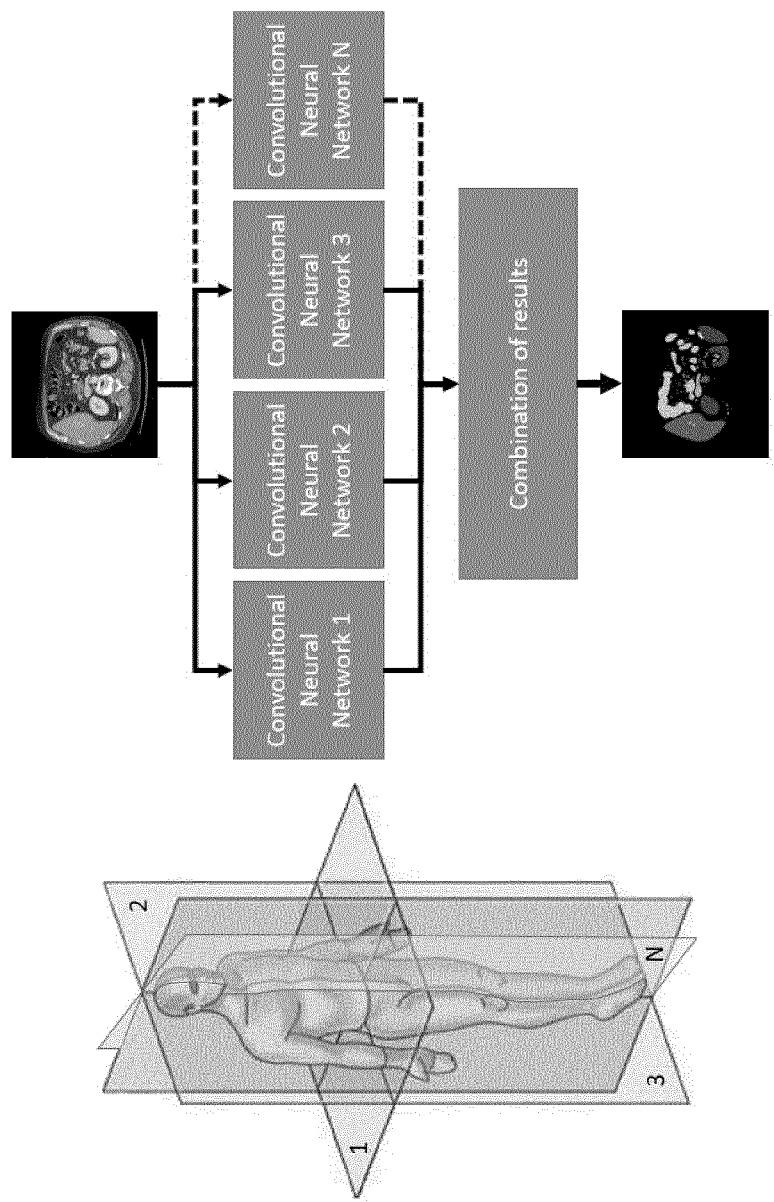
FIG. 6 is a schematic and symbolic representation of an other embodiment of the invention, showing a parallel arrangement of CNNs, and, FIGS. 7 and 8 are schematic and symbolic representations of other embodiments of the invention with parallel arrangements of CNNs.

Of course, such a multiple parallel 2D treatment with a combination of the results of these treatments can also be managed by a parallel arrangement of N independent CNNs, not integrated in a single framework (FIG. 6).

Figure 5:
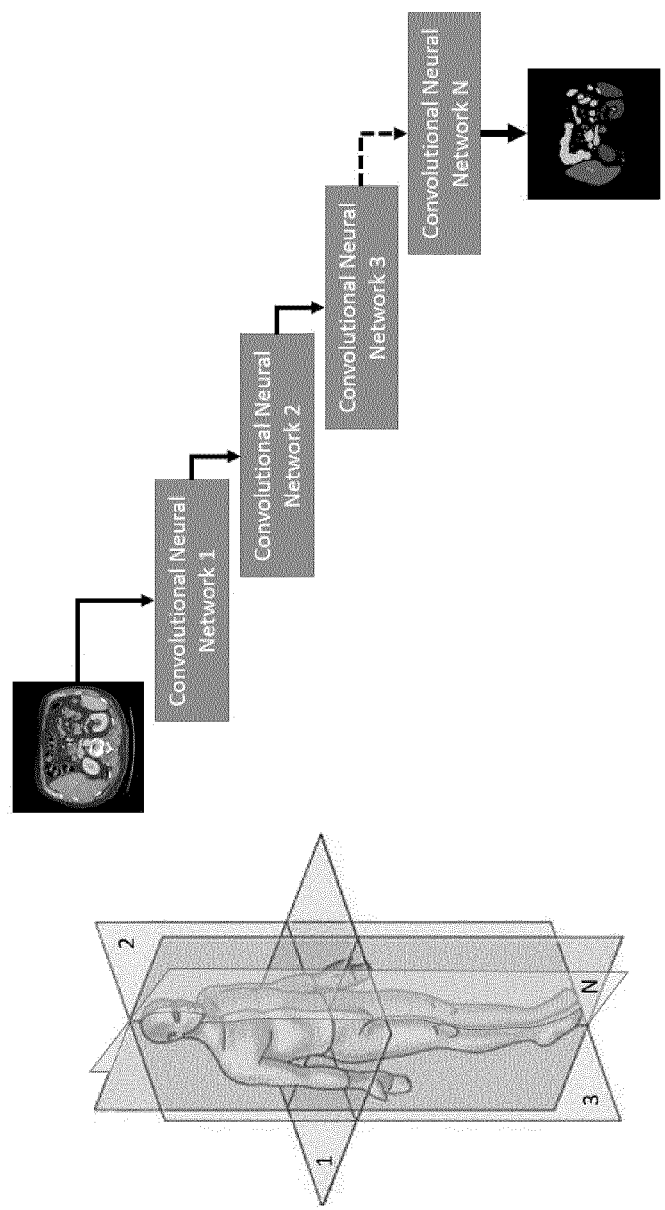
FIG. 5 is a schematic and symbolic representation of an other embodiment of the invention, showing a serial or sequential arrangement of CNNs.

According to a second alternative embodiment of the invention, shown on FIG. 5, the method can also consist in performing N sequential operational or image treatment steps, wherein each step is carried out by a CNN that automatically segments anatomical and pathological structures or instruments that can be seen in the 3D medical image, with each $CNN_i$ of said CNNs analysing all the voxels forming the volume of the 3D image according to a specific reconstruction plane for each of the N different CNNs and by using the results provided by the previous network in the sequence, $CNN_{i-1}$ when it exists.

In this case, the CNN 2D sequential treatment scheme is integrated in the global architecture of the algorithmic framework or in the structured geometry of the CNN arrangement, the final combination of the information of the sequence being thus intrinsically integrated in the structure of said framework or arrangement.

Figure 7:
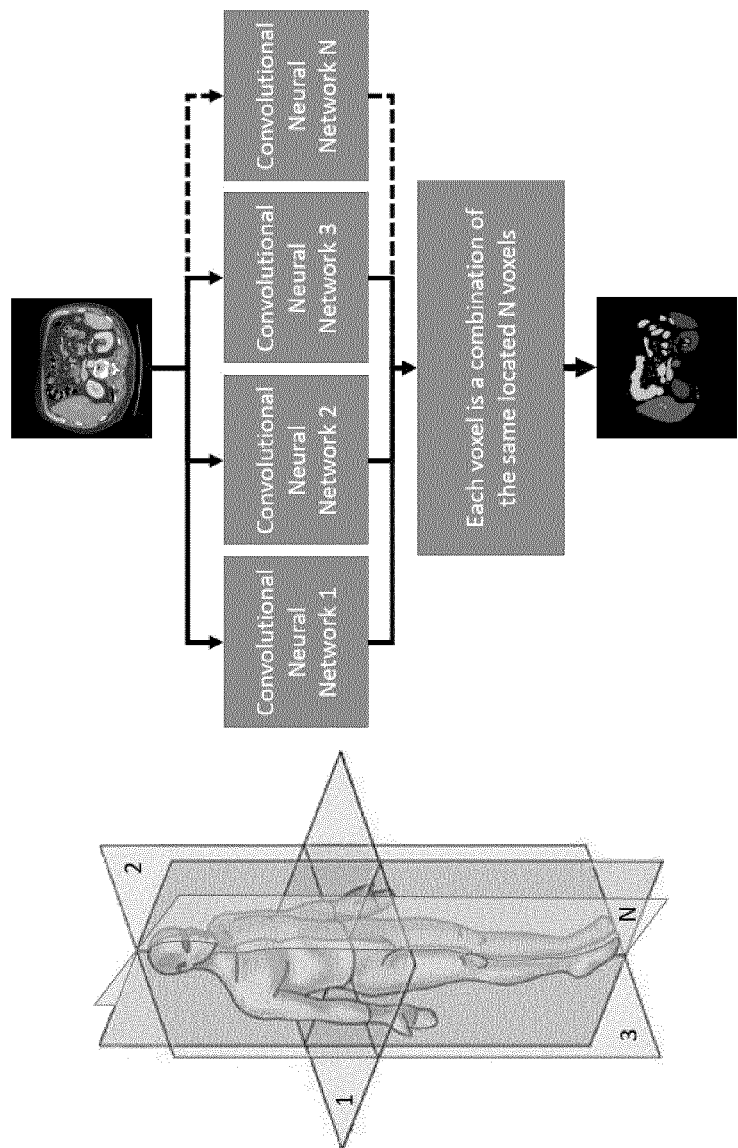
Figure 8:
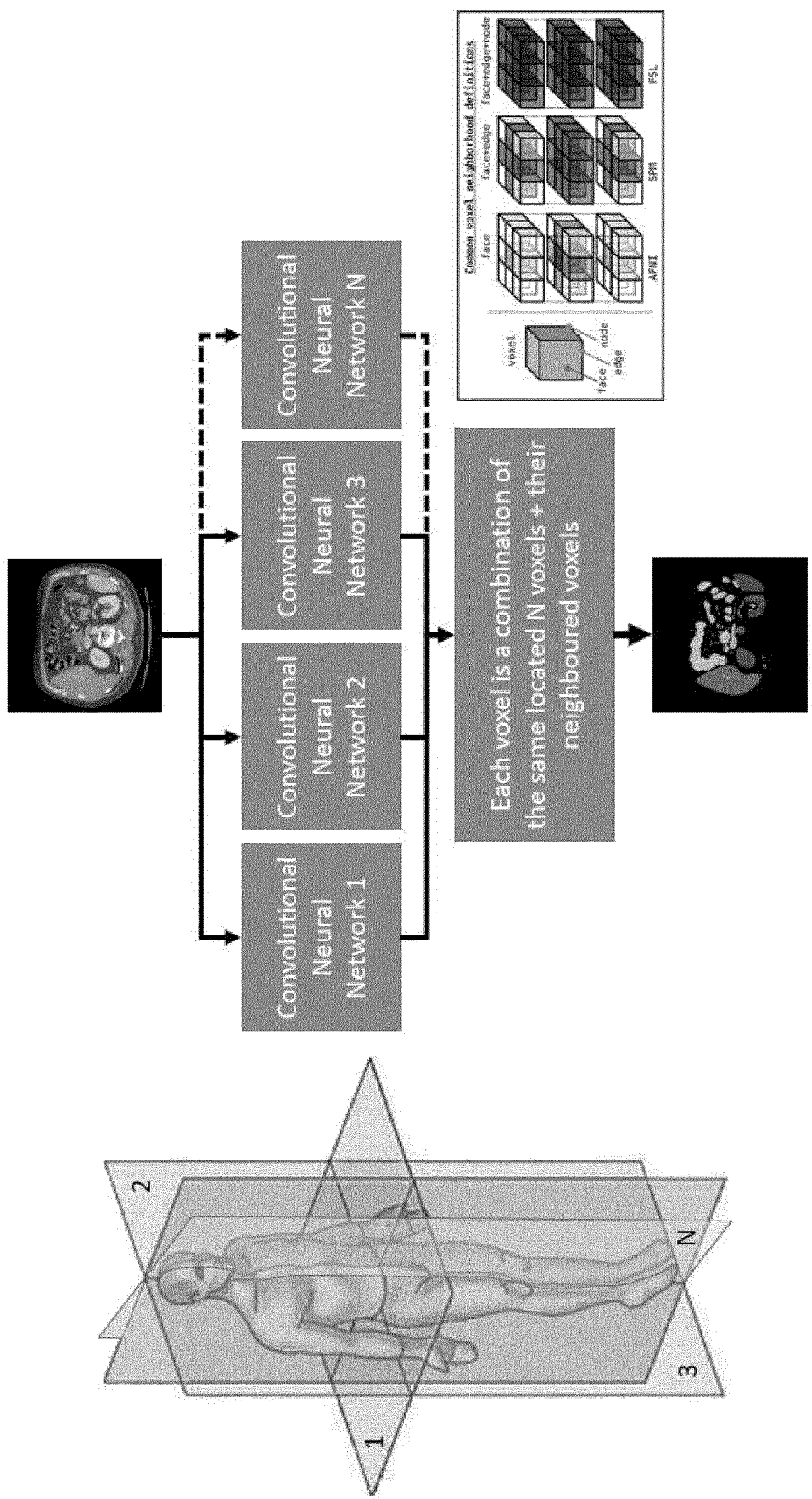

In relation to a preferred embodiment of the invention, shown on FIGS. 6 to 8, the segmentation method mainly consists in a combination of two successive operational steps, the first step consisting in performing N segmentations, each segmentation being done according to one of the N different reconstruction axes or planes, and the second step consisting in combining the results of these N segmentations into a single segmentation of anatomical and pathological structures, or instruments, that can be seen in the 3D medical image.

Advantageously, the first operational step is carried out by N different CNNs operating in parallel or sequentially, wherein each of these CNNs automatically segments, independently from the others, anatomical and pathological structures, or instruments, that can be seen in the 3D medical image, each CNN analysing all the voxels forming the volume of the 3D image according to a different reconstruction plane for each one of the N different CNNs.

According to a first alternative implementation of the invention, shown in FIG. 7, the second operational step, which is dedicated to the combination of the results of the N segmentations of the first step into a single segmentation of anatomical and pathological structures, or instruments that can be seen in the 3D medical image, is carried out by assigning to each voxel of the image volume a label corresponding to the combination of the N labels assigned to the very same voxel during the N segmentations of the first step.

According to a second alternative implementation of the invention; shown in FIG. 8, the second operational step, which is dedicated to the combination of the results of the N segmentations of the first step into a single segmentation of anatomical and pathological structures, or instruments that can be seen in the 3D medical image, is carried out by assigning to each voxel of the image volume a label corresponding to the combination of the N labels assigned to the very same voxel and to the neighbouring voxel(s) of that voxel, during the N segmentations of the first step.

In a 3D image volume, the neighbouring voxels of a given voxel may concern three different groups of voxels, namely (as shown on FIG. 8):
- the group of 6 voxels which are in face to face contact with the concerned voxel;
- the group of 18 voxels which are in face to face or edge to edge contact with the concerned voxel;
- the group of 26 voxels which includes the aforementioned group of 18 voxels and the 8 additional voxels which are in single point contact with the corner tips of the concerned voxels.

As illustrated in FIGS. 4 to 8, the N reconstruction planes (used when implementing the inventive method) preferably comprise the sagittal plane 2 and the frontal or coronal plane 3, as well as at least one other plane perpendicular to the transverse or axial plane 1, incorporating the intersection line of the sagittal and coronal planes and being angularly shifted around said line towards these planes.

In addition to the foregoing or alternatively to it, the N reconstruction planes may also comprise:
- planes which are parallel to the sagittal plane 2 or to the coronal plane 3, and/or,
- several mutually parallel axial planes 1.

The present invention also encompasses, as symbolically shown in FIGS. 4 to 8, a system for performing an automatic segmentation method as described before.

Said system is characterised in that it comprises at least one computer device hosting, in a structured arrangement, and allowing the coordinated working, in a sequential or a parallel organization, of N different convolutional neural networks (CNN), with N≥2, each $CNN_i$ being adapted and configured to perform, automatically and independently from the other CNNs, a segmentation of anatomical and pathological structures, or instruments, that can be seen in a 3D medical image to be treated, by analysing voxels forming said volume of the 3D image according to N different reconstruction axes or planes, each CNN being allocated to the analysis of the voxels belonging to one axis or plane.

Preferably, said system also comprises means to combine, and possibly display, the results of the analyses and segmentations performed by said N different CNNs.

According to a first alternative, the N different CNNs may be arranged in a serial architecture in such a way that each $CNN_i$ of said N different CNNs analyses all the voxels forming the volume of the 3D image according to a specific reconstruction plane for each of the N different CNNs and uses the results provided by the previous network $CNN_{i-1}$ when it exists (FIG. 5).

According to a second alternative, the N different CNNs may be arranged in a parallel architecture, possibly within a single algorithmic framework, the results of said N different CNNs being combined in a final stage (FIGS. 4, 6 and 8).

Of course, the invention is not limited to the at least one embodiment described and represented in the accompanying drawings. Modifications remain possible, particularly from the viewpoint of the composition of the various elements or by substitution of technical equivalents without thereby exceeding the field of protection of the invention.

The invention claimed is:

1. An automatic segmentation method of features, such as anatomical and pathological structures or instruments, which are visible in a 3D CT-scan, MRI or ultrasound type medical image of a subject, composed of voxels, said method comprising the steps of:
providing a global software means or arrangement combining N different convolutional neural networks of CNNs, with N>3
analyzing the voxels forming said volume of the 3D image according to N different reconstruction planes, said global software means showing a structured geometry or architecture of its CNNs which is adapted and comparable to that of the 3D image volume and each one of said CNNs being allocated to the analysis of the voxels belonging to one corresponding reconstruction plane among said N reconstruction planes, and
further comprising a combination of two successive operational steps:
performing N segmentations procedures, each segmentation being done according to one of the N different reconstruction planes by analyzing and segmenting the 2D medical images formed by all the voxels of the 3D image belonging respectively to one of said N reconstruction planes and forming the pixels of said 2D medical images, by means of a respectively dedicated $CNN_i$ among the N provided CNNs, so as to achieve for all N 2D medical images a segmentation of anatomical and pathological structures, or instruments, that can be respectively seen in each one of said N 2D medical images and
combining the end results of these N mutually independent 2D segmentations into a single 3D segmentation of anatomical and pathological structures, or instruments, that can be seen in the 3D medical image.

2. The automatic segmentation method according to claim 1, wherein said method includes providing a single neural network integrating in its structure N different CNNs, advantageously working in parallel, which automatically segment anatomical and pathological structures or instruments that can be seen in the 3D medical image, in that each CNN analyses all the voxels forming the volume of said 3D image according to a different reconstruction plane and in that the results of the different 2D analyses and segmentations are combined through convolution in the last structures of said neural network with structured geometry.

3. The automatic segmentation method according to claim 1, wherein said method includes performing N sequential operational or image treatment steps, wherein each step is carried out by a CNN that automatically segments anatomical and pathological structures or instruments that can be seen in the 3D medical image, with each $CNN_i$ of said CNNs analyzing all the voxels forming the volume of the 3D image according to a specific reconstruction plane for each of the N different CNNs and by using the results provided by the previous network in the sequence, $CNN_{i-1}$ when it exists.

4. The automatic segmentation method according to claim 1, wherein said first operational step is carried out by N different CNNs operating in parallel or sequentially, wherein each of these CNNs automatically segments, independently from the others, anatomical and pathological structures, or instruments, that can be seen in the 3D medical image, each CNN analyzing all the voxels forming the volume of the 3D image according to a different reconstruction plane for each one of the N different CNNs.

5. The automatic segmentation method according to claim 1, wherein the second operational step, which is dedicated to the combination of the results of the N segmentations of the first step into a single segmentation of anatomical and pathological structures, or instruments that can be seen in the 3D medical image, is carried out by assigning to each voxel of the image volume a label corresponding to the combination of the N labels assigned to the very same voxel during the N segmentations of the first step.

6. The automatic segmentation method according to claim 1, wherein the second operational step, which is dedicated to the combination of the results of the N segmentations of the first step into a single segmentation of anatomical and pathological structures, or instruments that can be seen in the 3D medical image, is carried out by assigning to each voxel of the image volume a label corresponding to the combination of the N labels assigned to the very same voxel and to the neighboring voxel(s) of that voxel, during the N segmentations of the first step.

7. The automatic segmentation method according to claim 1, wherein the N planes comprise the sagittal plane and the frontal or coronal plane, as well as at least one other plane perpendicular to the transverse or axial plane, incorporating the intersection line of the sagittal and coronal planes and being angularly shifted around said line towards these planes.

8. The automatic segmentation method according to claim 1, wherein the used N reconstruction planes comprise planes which are parallel to the sagittal plane or to the coronal plane.

9. The automatic segmentation method according to claim 1, wherein the used N reconstruction planes comprise several mutually parallel axial planes.

10. A system for performing an automatic segmentation method according to claim 1, comprising at least one computer device hosting, in a structured arrangement, and allowing the coordinated working, in a sequential or a parallel organization, of N different convolutional neural networks ($CNN_i$), with N≥3, wherein each $CNN_i$ being adapted and configured to perform, automatically and independently from the other CNNs, a segmentation of anatomical and pathological structures, or instruments, that can be seen in a 3D medical image to be treated, by analyzing voxels forming said volume of the 3D image according to N different reconstruction planes, namely by performing N segmentations, each segmentation being done according to one of the N different reconstruction planes by analyzing and segmenting the 2D medical images formed by all the voxels belonging to each one of said given planes and forming the pixels of said 2D medical images, by means of a respectively dedicated $CNN_i$ among the N provided CNNs, each $CNN_i$ being thus allocated to the analysis of the voxels belonging to one plane, and wherein said system also comprises means to combine, and possibly display, the results of the analyses and 2D segmentations performed by said N different $CNN_i$.

11. The system according to claim 10, wherein the N different CNNs are arranged in a serial architecture in such a way that each $CNN_i$ of said N different CNNs analyses all the voxels forming the volume of the 3D image according to a specific reconstruction plane for each of the N different CNNs and uses the results provided by the previous network $CNN_{i-1}$ when it exists.

12. The system according to claim 10, wherein the N different CNNs are arranged in a parallel architecture, possibly within a single algorithmic framework, the results of said N different CNNs being combined in a final stage.

13. An automatic segmentation method of features, such as anatomical and pathological structures or instruments, which are visible in a 3D CT-scan, MRI or ultrasound type medical image of a subject, composed of voxels,
said method comprising the steps of:
providing a global software means or arrangement combining N different convolutional neural networks of CNNs, with N>3
analyzing the voxels forming said volume of the 3D image according to N different reconstruction planes, said global software means showing a structured geometry or architecture of its CNNs which is adapted and comparable to that of the 3D image volume and each one of said CNNs being allocated to the analysis of the voxels belonging to one corresponding reconstruction plane among said N reconstruction planes, and
further comprising a combination of two successive operational steps:
performing N segmentations procedures, each segmentation being done according to one of the N different reconstruction planes by analyzing and segmenting the 2D medical images formed by all the voxels of the 3D image belonging respectively to one of said N reconstruction planes and forming the pixels of said 2D medical images, by means of a respectively dedicated $CNN_i$ among the N provided CNNs, so as to achieve for all N 2D medical images a segmentation of anatomical and pathological structures, or instruments, that can be respectively seen in each one of said N 2D medical images and
combining the end results of these N mutually independent 2D segmentations into a single 3D segmentation of anatomical and pathological structures, or instruments, that can be seen in the 3D medical image,
wherein said method includes providing a single neural network integrating in its structure N different CNNs with N>3, advantageously working in parallel, which automatically segment anatomical and pathological structures or instruments that can be seen in the 3D medical image, in that each CNN analyses all the voxels forming the volume of said 3D image according to a different reconstruction plane and in that the results of the different 2D analyses and segmentations are combined through convolution in the last structures of said neural network with structured geometry, and
wherein the second operational step, which is dedicated to the combination of the results of the N segmentations of the first step into a single segmentation of anatomical and pathological structures, or instruments that can be seen in the 3D medical image, is carried out by assigning to each voxel of the image volume a label corresponding to the combination of the N labels assigned to the very same voxel and to the neighboring voxel(s) of that voxel, during the N segmentations of the first step.

14. An automatic segmentation method of features, such as anatomical and pathological structures or instruments, which are visible in a 3D medical image of a subject, composed of voxels,
said method comprising the steps of
providing a global software means or arrangement combining N different convolutional neural networks or CNNs, with N>3, and having a structured geometry or architecture adapted and comparable to that of the image volume,
in analyzing voxels forming said volume of the 3D image according to N different reconstruction axes or planes, each CNN being allocated to the analysis of the voxels belonging to one axis or plane,
wherein for each of the N reconstruction planes of the 3D image, it further consists in analyzing and segmenting the 2D image formed by the voxels of a given plane by means of a dedicated $CNN_i$ among the N provided CNNs with N>3, said CNNs being structured similarly to the 3D image volume, and in combining the intermediary or end results of said N analyses performed by said different CNNs, and
wherein said method further includes performing N sequential operational or image treatment steps, wherein each step is carried out by a CNN that automatically segments anatomical and pathological structures or instruments that can be seen in the 3D medical image, with each $CNN_i$ of said CNNs analyzing all the voxels forming the volume of the 3D image according to a specific reconstruction plane for each of the N different CNNs and by using the results provided by the previous network in the sequence, $CNN_{i-1}$ when it exists.

* * * * *